US009246829B2

(12) United States Patent
Pan et al.

(10) Patent No.: US 9,246,829 B2
(45) Date of Patent: Jan. 26, 2016

(54) UTILIZING LATENCY CONTROL TO ALLEVIATE BUFFERBLOAT

(71) Applicant: Cisco Technology, Inc., San Jose, CA (US)

(72) Inventors: Rong Pan, Saratoga, CA (US); Preethi Natarajan, Los Gatos, CA (US); Chiara Piglione, San Jose, CA (US); Mythili Suryanarayana Prabhu, San Jose, CA (US); Frederick Juergens Baker, Goleta, CA (US); Bill Carroll VerSteeg, Buford, GA (US); Vijaynarayanan Subramanian, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 206 days.

(21) Appl. No.: 13/874,600

(22) Filed: May 1, 2013

(65) Prior Publication Data

US 2014/0328175 A1 Nov. 6, 2014

(51) Int. Cl.
| | |
|---|---|
| H04L 12/801 | (2013.01) |
| H04L 12/835 | (2013.01) |
| H04L 12/851 | (2013.01) |
| H04L 12/823 | (2013.01) |
| H04L 12/863 | (2013.01) |
| H04L 12/841 | (2013.01) |

(52) U.S. Cl.
CPC .............. *H04L 47/32* (2013.01); *H04L 47/127* (2013.01); *H04L 47/283* (2013.01); *H04L 47/30* (2013.01); *H04L 47/6255* (2013.01)

(58) Field of Classification Search
CPC ........ H04L 47/10; H04L 47/30; H04L 47/2441
USPC .................................................. 370/229, 235
See application file for complete search history.

(56) References Cited

U.S. PATENT DOCUMENTS

| 6,157,653 | A | * | 12/2000 | Kline et al. .................... 370/412 |
|---|---|---|---|---|
| 2005/0147032 | A1 | * | 7/2005 | Lyon et al. .................... 370/229 |
| 2010/0309783 | A1 | * | 12/2010 | Howe ............................. 370/230 |
| 2012/0182870 | A1 | * | 7/2012 | Francini ......................... 370/235 |

OTHER PUBLICATIONS

Rong Pan et al.; "PIE: A Lightweight Control Scheme to Address the Bufferbloat Problem"; Internet Draft , Network Working Group; www.ietf.org; Dec. 10, 2012; pp. 1-12.

* cited by examiner

*Primary Examiner* — Ronald B Abelson
(74) *Attorney, Agent, or Firm* — P. Su

(57) ABSTRACT

In one embodiment, a method includes estimating a current queuing latency, the estimated current queuing latency being associated with a queue of packets maintained in a buffer. The method also includes calculating a current drop or mark probability, the current drop or mark probability being associated with a probability that packets associated with the queue of packets will be dropped or marked. A rate at which the packets associated with the queue of packets are dequeued from the buffer is estimated in order to estimate the current queuing latency. The current drop or mark probability is calculated using the current estimated queuing latency.

18 Claims, 9 Drawing Sheets

UTILIZING LATENCY CONTROL TO ALLEVIATE BUFFERBLOAT

TECHNICAL FIELD

The disclosure relates generally to network communications. More particularly, the disclosure relates to utilizing latency control to alleviate bufferbloat.

BACKGROUND

Network nodes or elements, e.g., routers, switches, and hosts, often include buffers that obtain and effectively hold packets for a period of time before allowing the packets to be transmitted through a network, e.g., a packet-switched computer network. As will be appreciated by those skilled in the art, buffering generally reduces the likelihood that packets are dropped or lost, and allows for network bandwidth to be used efficiently.

As the volume of Internet traffic increases, demands for buffering capabilities increases. Thus, the sizes of buffers incorporated into network nodes are also increasing. As such, the volume of packets that may be stored in a buffer may be excessive. That is, there is often an excess buffering of packets within a network.

Bufferbloat occurs when excess buffering of packets inside a network causes high latency and jitter. Often, bufferbloat also causes overall network throughput to be compromised. High latency, jitter, and loss of overall network throughput generally have an adverse effect on the performance of a network.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes estimating a current queuing latency, the estimated current queuing latency being associated with a queue of packets maintained in a buffer. The method also includes calculating a current drop or mark probability, the current drop or mark probability being associated with a probability that packets associated with the queue of packets will be dropped or marked. A rate at which the packets associated with the queue of packets are dequeued from the buffer is estimated in order to estimate the current queuing latency. The current drop or mark probability is calculated using the current estimated queuing latency.

Description

Bufferbloat is a phenomenon whereby excess buffering of packets within a network causes relatively high latency and jitter within the network. Bufferbloat may be caused by factors including, but not limited to, the exponential growth of Internet traffic due at least in part to increases in video traffic, the availability of memory, and the operational nature of the traffic. Relatively high latency and jitter, as well as a loss of overall network throughput, compromises the performance of a network.

Active queue management associated with a buffer may generally be implemented to alleviate issues associated with bufferbloat. In one embodiment, active queue management may involve a proportional integral controller enhanced (PIE) that is arranged to estimate a queuing latency or a delay, calculate the probability that any incoming packets will be dropped based on the estimated queuing latency, and control the queuing latency based on the probability that any packets will be dropped. By controlling the latency associated with a queue, stability may be maintained with respect to a buffer across a variety of different traffic scenarios. In general, by controlling a queuing latency or delay, issues associated with bufferbloat may be substantially minimized.

Using PIE, queuing latency or delay may be maintained at an acceptable or reference level regardless of congestion levels. For example, the queuing latency or delay of Transmission Control Protocol (TCP) and Stream Control Transmission Protocol (SCTP) traffic may be kept at a relatively low level even as a number of flows increases, as well as under persistent congestion caused by User Datagram Protocol (UDP) traffic.

Figure 1:
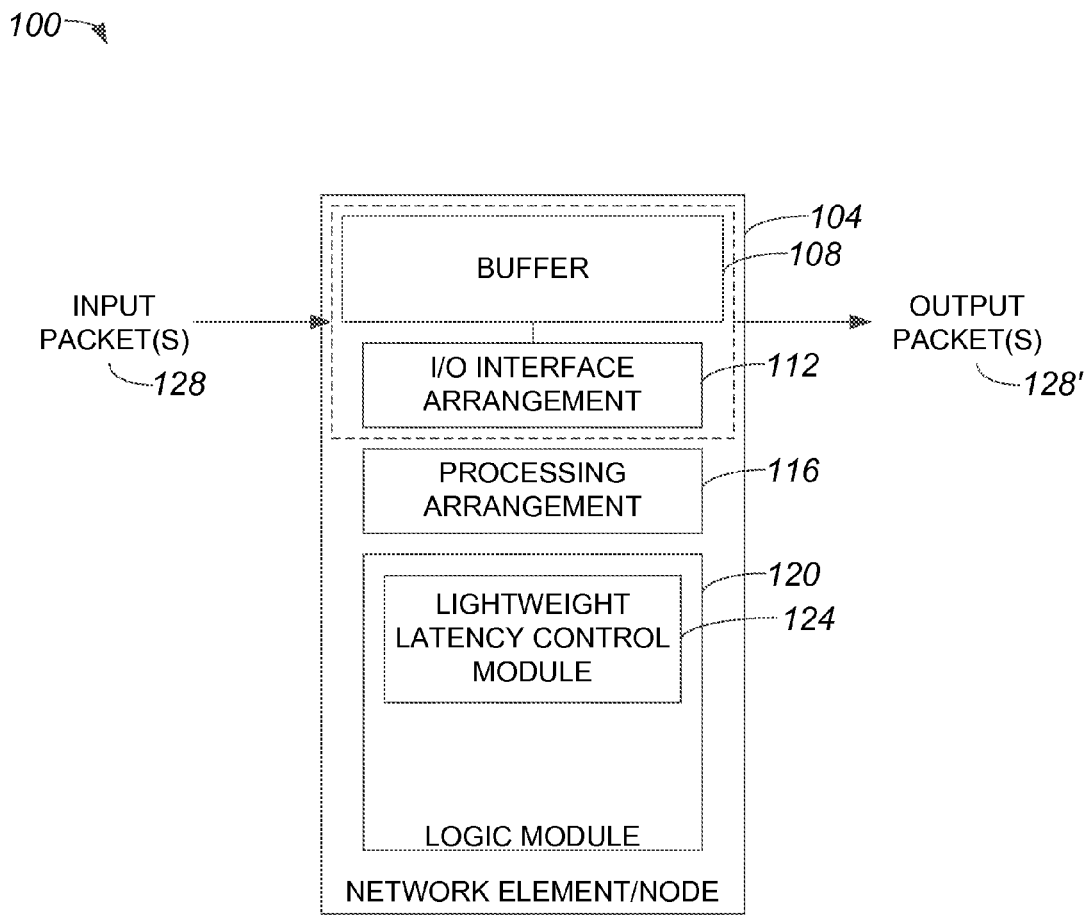
FIG. 1 is a diagrammatic representation of a network element or node that includes a buffer that may be controlled using lightweight latency control in accordance with an embodiment.

Referring initially to FIG. 1, a network element or node that includes a buffer with a queuing latency that is controlled will be described in accordance with an embodiment. A network element or node may include any suitable processing device operable to process communications of a communication network 100. As just two particular examples, a network element or node may include any suitable combination of a router and a switch. For purposes of this description, the terms "network element" and "network node," or simply element and node, respectively, may be used interchangeably. Within communications network 100, a network element 104 may be arranged to obtain at least one input packet 128 and to forward at least one output packet 128'. As will be appreciated by those skilled in the art, packets 128 may be obtained through a communications channel in network 100, and may be provided to a communications channel in network 100. Input packets 128 may be obtained through an input/output (I/O) interface arrangement 112, and outputted from I/O interface arrangement 112.

Network element 104 generally includes a buffer 108, or a memory, into which input packets 128 obtained by I/O interface arrangement 112, e.g., by an input port of I/O interface arrangement 112, may be held, or queued. Network element 104 also includes a processing arrangement 116 and a logic module 120. Logic module 120 may include any suitable combination of hardware, firmware, and software, and processing arrangement 116 is generally configured to execute substantially any software logic included in logic module 120.

Logic module 120 includes a lightweight latency control module 124. Control module 124 generally includes hardware and/or software logic configured to effectively control congestion and a queuing latency associated with buffer 108. Control module 124 is generally arranged to monitor buffer 108, to estimate a queuing latency associated with buffer 108, and to calculate or otherwise determine a drop or mark probability for packets contained within buffer 108. Using information relating to a drop or mark probability, or a probability that packets will be dropped or marked, the queuing latency may be controlled or effectively maintained at a desired level such that congestion associated with buffer 108, as well as network 100, may be substantially controlled. Congestion associated with buffer 108 is controlled, in one embodiment, using control module 124, which may facilitate an implementation of an algorithm such as one that marks and/or drops packets based on information provided by lightweight latency control module 124b.

Figure 2:
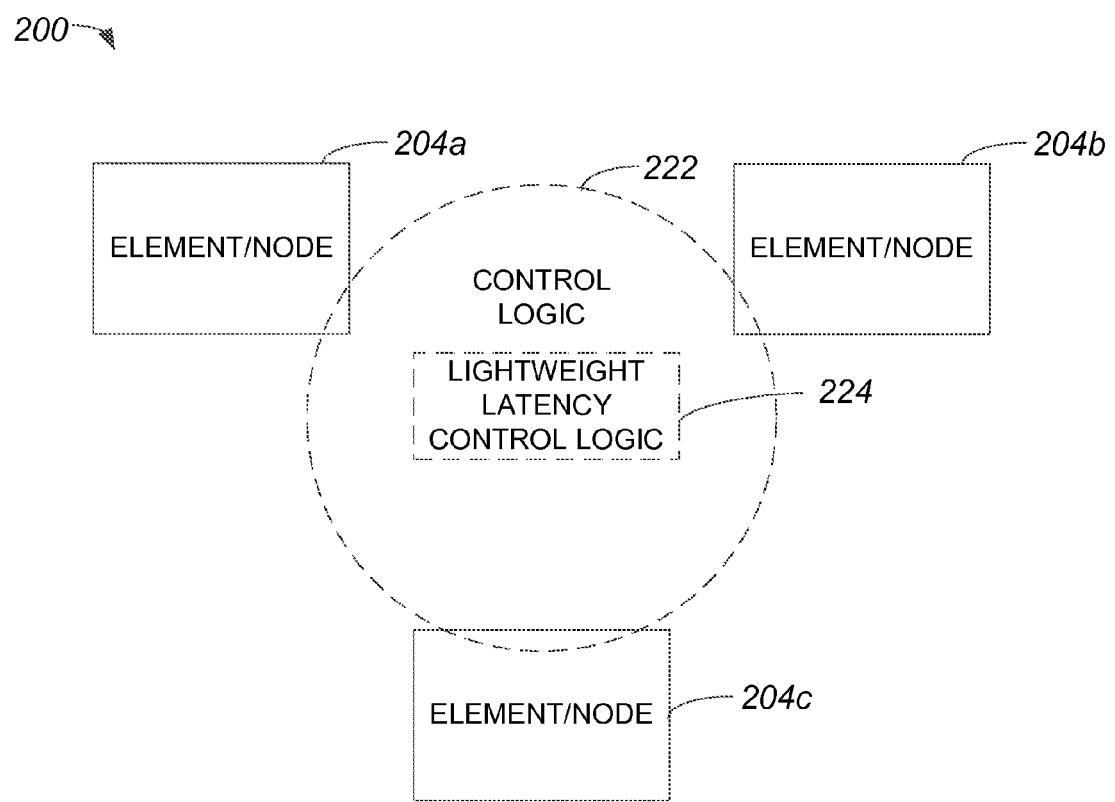
FIG. 2 is a block diagram representation of a network in which a control system that includes lightweight latency control logic is distributed throughout the network in accordance with an embodiment.

In one embodiment, congestion control module 124a and lightweight latency control module 124b may be embodied substantially entirely on network element 104. That is, logic associated with controlling the output of output packets 128' from buffer 104 is not limited to being embodied substantially only on network element 104. By way of example, logic associated with controlling the output of output packets 128' from buffer 104 may instead be distributed on multiple elements within a network. FIG. 2 is a block diagram representation of a network in which a control system that is configured to provide congestion control and lightweight latency control is distributed throughout the network in accordance with an embodiment. A network 200 includes multiple elements 204a-c, e.g., routers and/or switches that are in communication with each other. Overall control logic 222 is generally arranged to control the flow of packets within network 200, and may be distributed such that portions of control logic 222 are associated with each element 204a-c. As such, lightweight latency control logic 224, which is included in overall control logic 222, as well as control logic 222 itself, are both effectively distributed among elements 204a-c. In one embodiment, logic 222 may be substantially programmable such that an application may effectively set parameters, e.g., a delay reference, through the use of an application programming interface (API).

Figure 3:
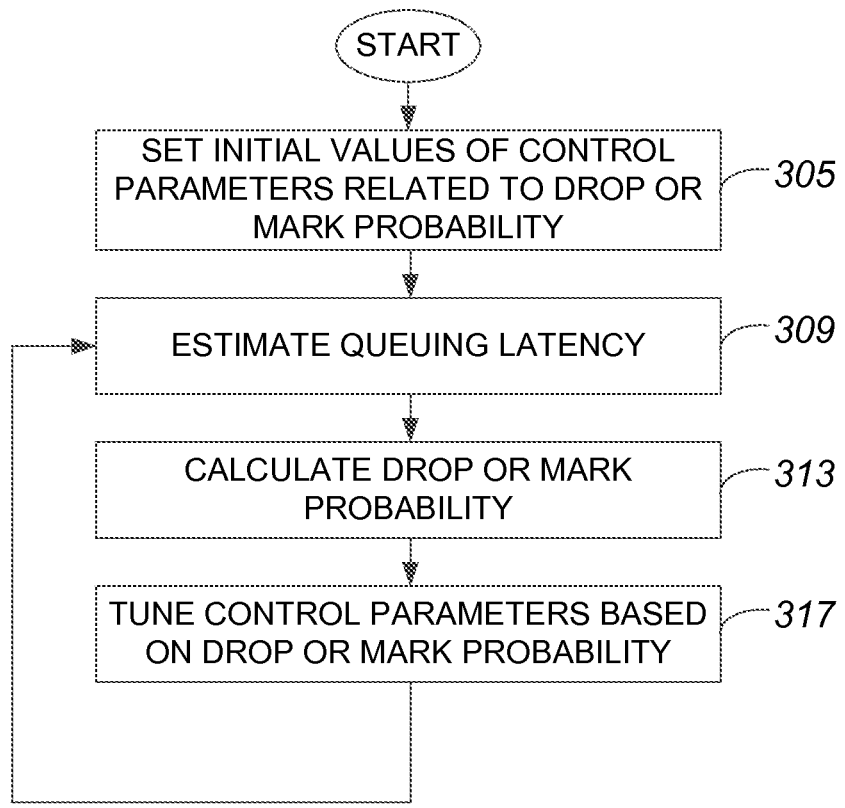
FIG. 3 is a process flow diagram that illustrates a method of causing congestion to be controlled using an estimate of a queue, or queuing, latency in accordance with an embodiment.

As previously mentioned, in order to control congestion within a network, a queuing latency may be estimated and, using the estimated queuing latency, a drop or mark probability may be determined. With reference to FIG. 3, a method of controlling congestion will be described in accordance with an embodiment. A method 301 of controlling congestion begins at step 305 in which initial values of control parameters related to a drop or mark probability are set. In one embodiment, a drop or mark probability may be expressed as follows:

$$\text{drop\_probability}(n) = \text{drop\_probability}(n-1) + a^* (\text{queue\_delay}(n) - \text{queue\_delay\_reference}) + b^* (\text{queue\_delay}(n) - \text{queue\_delay}(n-1))$$

where drop_probability(n) is a drop or mark probability at a current time "n", drop_probability(n−1) is a drop or mark probability at a previous time "n−1", queue_delay(n) is an estimated queuing latency at time "n", queue_delay(n−1) is an estimated queuing latency at time "n−1", queue_delay_reference is a reference value, and "a" and "b" are control parameters. In one embodiment, queue_delay_reference is a target value for a queuing latency, or an acceptable queuing delay under congestion. It should be appreciated that in one embodiment, control parameters are expressed in units of Hertz (Hz), and values such as initial values may be set or otherwise tuned based on a control analysis. While control parameter "a" and control parameter "b" may be constant values, it should be appreciated that control parameter "a" and control parameter "b" may instead vary as a function of congestion. An initial value of control parameter "a" may be approximately 0.125 Hz and an initial value of control parameter "b" may be approximately 1.25 Hz, while queue_delay_reference may have a value of approximately twenty milliseconds (ms) when a packet arrival and departure rate is approximately ten megabits per second (Mbps), which reflects an acceptable queuing delay under congestion. It should be understood, however, that initial values for control parameter "a" and control parameter "b", as well as a value of queue_delay_reference may vary widely. For example, when congestion is relatively mild, control parameter "a" and control parameter "b" may be chosen to have relatively small values to effectively ensure a gentle, single step adjustment. Alternatively, when congestion is not relatively mild, control parameter "a" and control parameter "b" may be chosen to have relatively large values.

After initial values of control parameter "a" and control parameter "b" are set, a current queuing latency is estimated in step 309. The current queuing latency, or queue_delay, may be estimated using a variety of different methods. Such methods may include, but are not limited to including, estimating a departure rate and then calculating a queueing latency, and utilizing time stamps.

Once a current queuing latency is estimated, a drop or mark probability is calculated in step 313. Then, in step 317, control parameter "a" and control parameter "b" may be tuned based on the drop or mark probability calculated in step 313. In one embodiment, control parameter "a" may effectively control a deviation of a current delay from a reference delay, while control parameter "b" may effectively control a deviation from a previous delay. It should be appreciated that control parameter "a" and control parameter "b" may be tuned based, for example, on whether the current queuing latency is trending up or trending down. It should also be appreciated that the relative weight between control parameter "a" and control parameter "b" may be set to determine a balance between latency offset and latency jitter. For example, control parameter "a" and control parameter "b" may be tuned to have relatively larger values when the drop or mark probability is relatively large, and control parameter "a" and control parameter "b" may be tuned to have relatively smaller values when the drop or mark probability is relatively small. From step 317, process flow returns to step 309 in which queuing latency is estimated.

Figure 4A:
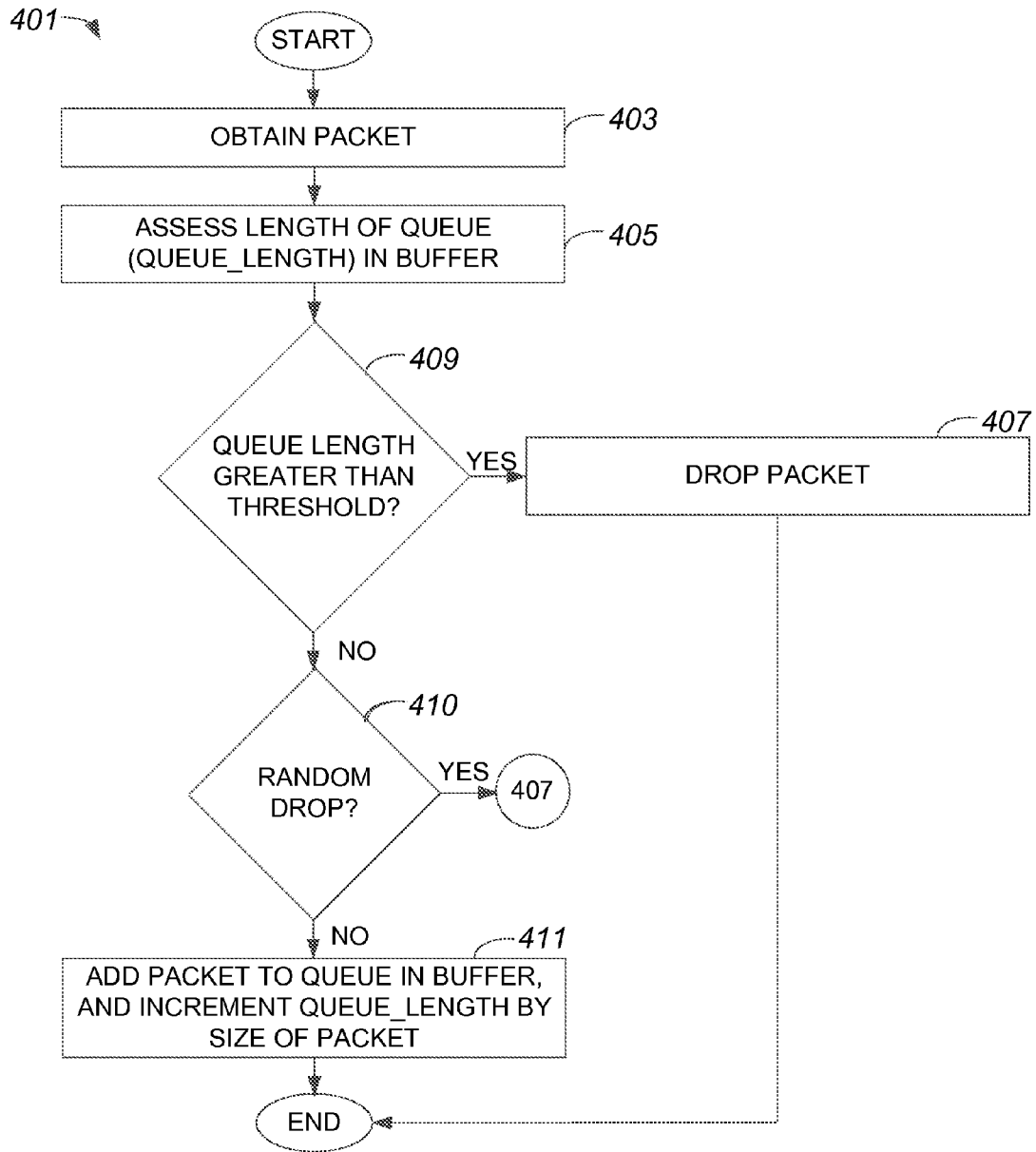
FIGS. 4A, 4B, and 4C are process flow diagrams which illustrate methods of enqueuing a packet, dequeuing, and packet, and updating a drop or mark probability in a non-periodic manner in accordance with an embodiment.
Figure 4B:
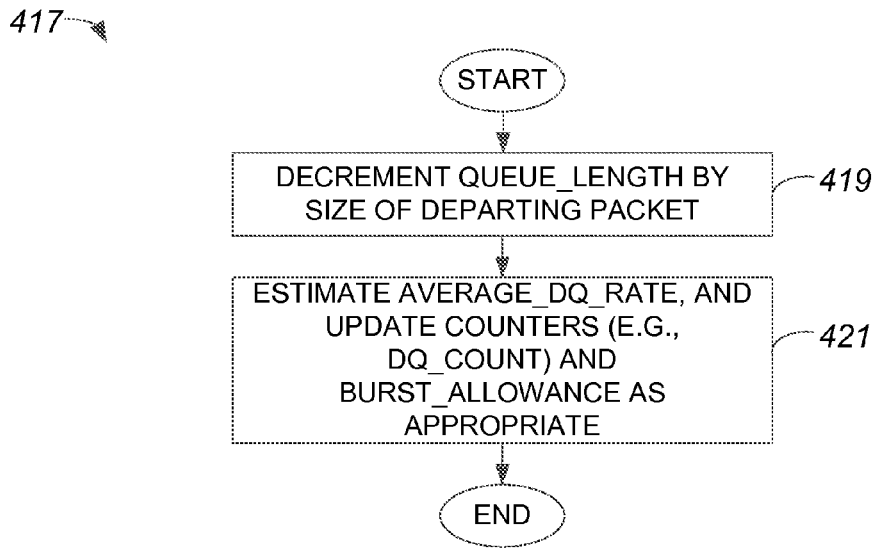
Figure 4C:
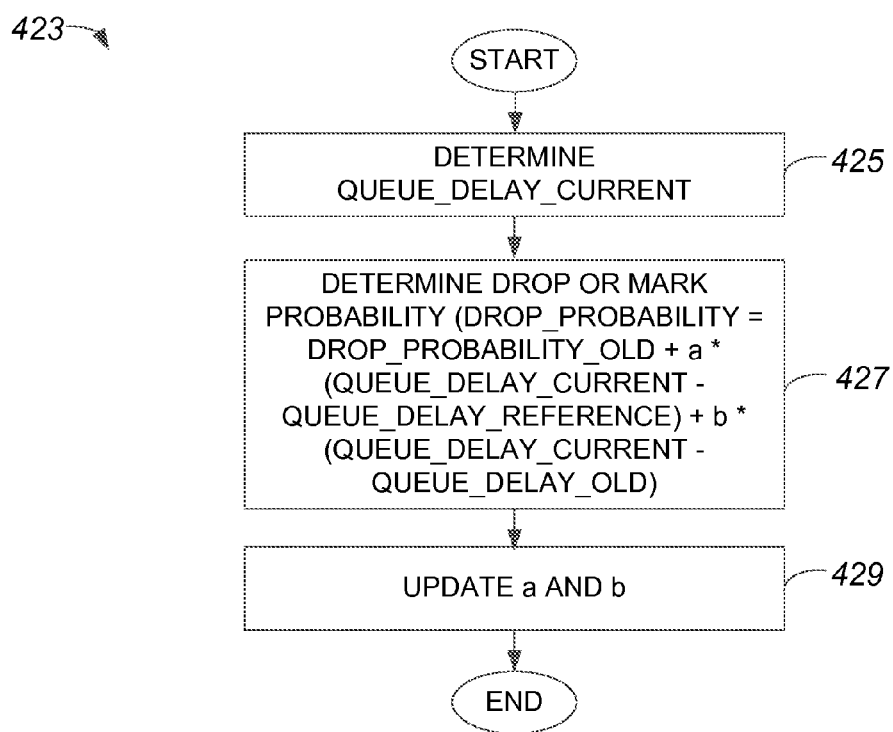

In determining a drop or mark probability, a queuing latency is generally estimated. A queuing latency may be estimated using a variety of different methods. With reference to FIGS. 4A-C, an overall method of determining a drop or mark probability in which departure rates are estimated substantially asynchronously, and with reference to FIGS. 5A and 5B, a method of determining a drop or mark probability in which departure rates are estimated periodically will be described.

It should be understood that methods of enqueueing packets, dequeueing packets, and determining a drop or mark probability may either include functionality that occurs sequentially, or functionality may generally occur in any suitable order, including in sequence and/or in parallel, according to particular needs. That is, the functionality described in FIGS. 4A-C, as well as in FIGS. 5A and 5B, may occur substantially in parallel or in sequence.

FIGS. 4A-C are process flow diagrams which generally illustrate an overall process of ascertaining a drop or mark probability in accordance with an embodiment. A method 401, as shown in FIG. 4A, of enqueuing a packet begins at step 403 in which a packet is obtained. Upon obtaining the packet, the length of a queue in a buffer is assessed in step 405. A current queue length queue_length may be measured in bytes, and may be determined by monitoring a buffer. It should be appreciated that a current queue length may generally be assessed upon the arrival of a packet that is either to be dropped or to be enqueued.

Once the current queue length is measured, a determination is made in step 409 as to whether the current queue length is greater than a threshold, e.g., a predetermined substantially maximum queue length above which incoming packets are to be dropped. In one embodiment, a threshold may be associated with a physical buffer length. That is, a threshold may be a tail drop threshold and/or associated with a physical limitation, e.g., a physical size of a queue, If it is determined that the packet obtained in step 403 is not to be dropped, then it is determined in step 410 as to whether the packet is to be randomly dropped. Such a determination is, in one embodiment, based on a calculated drop or mark probability. If it is determined that the packet is to be randomly dropped, then the packet is dropped in step 407. Alternatively, the packet is added to the queue in the buffer, and the queue length is incremented by the size of the packet in step 411, and the method of enqueuing a packet is completed.

FIG. 4B illustrates a method of dequeuing a packet in accordance with an embodiment. A method 417 of dequeuing a packet begins at step 419 in which a queue_length is decremented by the size of a departing packet, i.e., a packet departing from a queue.

In step 421, when the end of a measuring cycle is effectively detected, an average dequeuing rate average_dq_rate is calculated. In some instances, average_dq_rate may be calculated as a time averaging dequeuing rate. In one embodiment, an average_dq_rate may typically be determined as follows:

$$\text{average\_dq\_rate} = k * \text{average\_dq\_rate} + (1-k) * \frac{\text{dq\_count}}{\text{current\_time} - \text{dq\_start}}$$

The variable current_time is a current time, or a time at which average_dq_rate is calculated. The variable dq_count is a number of bytes that have dequeued, or departed from the buffer, since the initiation of a current measurement cycle. It should be appreciated that dq_count is generally incremented substantially only when certain conditions are met, e.g., when a queue length is above a certain threshold at the start of a measurement cycle. The variable dq_start is a start timestamp of a current measurement cycle and, thus, current_time− dq_start is effectively a length, in time, of a current measurement cycle. It should be understood that a value of "k" may generally vary. In one embodiment, "k" may have a value of 0.9. After the average dequeuing rate is calculated, the method of dequeuing a packet is completed.

A determination of whether to estimate a drop or mark probability may be based on a number of different factors including, but not limited to including, the expiration of a timer. When the drop or mark probability is based on a timer, the drop or mark probability is generally estimated in a periodic manner. It should be appreciated that the determination of whether to estimate the drop or mark probability may involve setting or resetting various parameters.

It should be appreciated that a measurement cycle is generally a period of time over which a dequeuing rate is estimated. A current measurement cycle may generally begin when a certain number of packets is identified in a queue, and may generally end when an appropriate condition is met, e.g., when dq_count crosses a threshold. In one embodiment, when dq_count crosses a threshold, average_dq_rate may be estimated. It should be appreciated that once a current measurement cycle ends, a new measurement cycle may begin upon a certain number of packets being identified in the queue.

FIG. 4C is a process flow diagram that illustrates a method of estimating a drop or mark probability, which may generally be calculated periodically, in accordance with an embodiment. A method 423 begins at step 425 in which a current queueing delay queue_delay_current is determined. For example, in one embodiment, the current queuing latency queue_delay_current may be estimated as follows:

$$\text{queue\_delay\_current} = \frac{\text{queue\_length}}{\text{average\_dq\_rate}}$$

The variable queue_length refers to a current queue length, which may be measured in bytes. It should be appreciated that queue_length may be incremented upon the arrival of packets in a queue, and is typically decremented upon the departure of packets from the queue. A burst allowance burst_allowance may be updated. As will be appreciated by those skilled in the art, a burst_allowance may specify a burst size, e.g., a burst size in seconds, that is allowed before packets may be randomly dropped.

In step 427, a drop or mark probability drop_probability is determined. The drop or mark probability drop_probability may be expressed as follows:

drop_probability=drop_probability_old+a*(queue_delay_current−queue_delay_reference)+b* (queue_delay_current−queue_delay_old)

The variable drop_probability_old is a drop or mark probability at a previous time, e.g., drop_probability may be expressed as drop_probability(n) and drop_probability_old may be expressed as drop_probability(n−1). Similarly, queue_delay_old, or queue_delay(n−1) is an estimated queuing latency at a previous time. Once the drop or mark probability drop_probability is determined, variables "a" and "b" may be updated in step 429, and the process of estimating a drop or mark probability is completed.

Figure 5A:
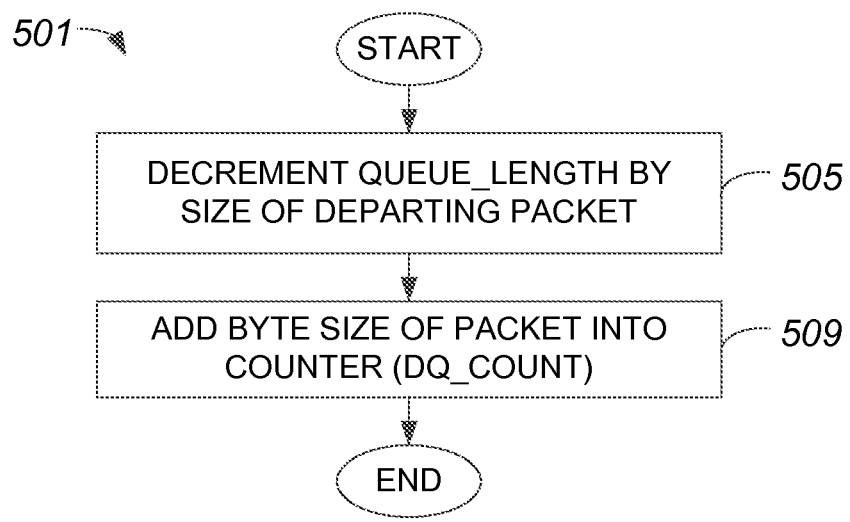
FIG. 5A is a process flow diagram which illustrates a method of dequeueing a packet r in accordance with an embodiment.

With reference to FIG. 5A, a method of obtaining a counter, e.g., a dequeue counter, for use in estimating a packet departure rate in a periodic manner will be described in accordance with an embodiment. A method 501 begins at step 505 in which a queue length queue_length is decremented by the size of a packet departing from a buffer or a queue. In one embodiment, a buffer may be monitored in order to determine or otherwise identify a packet departure. The byte size of a packet which has departed from a buffer or a queue is added to a counter dq_count in step 509. Once the counter dq_count is incremented, the method may end. It should be appreciated that method 501 is typically repeated each time a packet departs, e.g., upon the next packet departure. In addition, it should also be appreciated that dq_count is typically incremented when in a measurement cycle. In the described embodiment, the measurement cycle may effectively be substantially equal to a sampling interval.

Figure 5B:
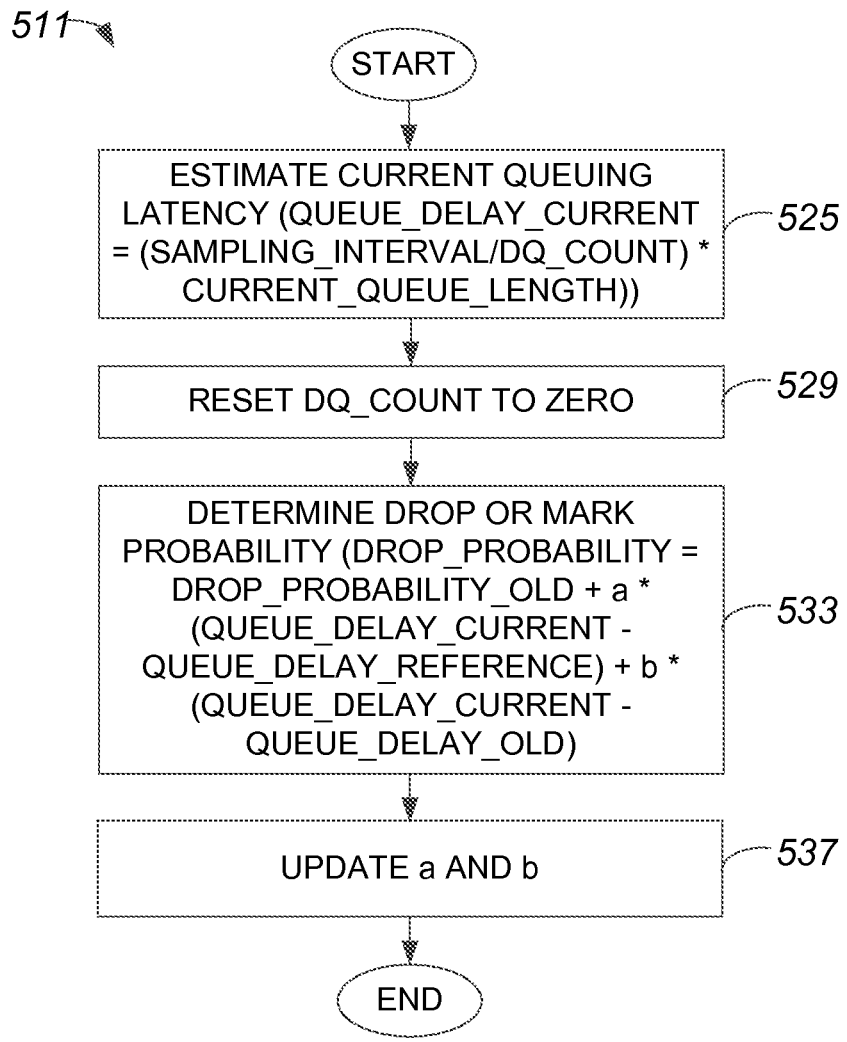
FIG. 5B is a process flow diagram which illustrates a method of ascertaining an estimation of a dequeue rate, on which a drop or mark probability is calculated, in a periodic manner in accordance with an embodiment.

FIG. 5B is a process flow diagram which illustrates a method of ascertaining a drop or mark probability in a periodic manner in accordance with an embodiment. A method 511, which may be repeated periodically, begins at step 525 in which a queue latency queue_delay_current is estimated. The queue latency queue_delay_current may be estimated as follows:

$$\text{queue\_delay\_current} = \left(\frac{\text{sampling\_interval}}{\text{dq\_count}}\right) * \text{queue\_length}$$

The variable queue_length is the current length of the queue, and sampling_interval is the sampling interval. It should be appreciated that a queuing latency may be estimated, in one embodiment, when a sampling interval is reached. A sampling interval may vary widely depending on any number of factors, e.g., depending upon the arrival rate of a packet. By way of example, when a speed is on the order of Mbps, a sampling interval is approximately 30 ms, determining whether it is an appropriate time to estimate the queuing latency queue_delay_current may include determining when the sampling interval of approximately 30 ms has elapsed since a previous time when the queuing latency queue_delay_current was last estimated.

In step 529, counter dq_count is reset to zero. Then, in step 533, the drop or mark probability drop_probability may be determined. As discussed above with respect to FIGS. 4A-C, the drop or mark probability drop_probability may be expressed as follows:

drop_probability=drop_probability_old+$a$*(queue_delay_current−queue_delay_reference)+$b$*(queue_delay_current−queue_delay_old)

After the drop or mark probability drop_probability is determined, variables "a" and "b" may be updated in step 537, and the method of ascertaining a drop or mark probability may end.

Figure 6:
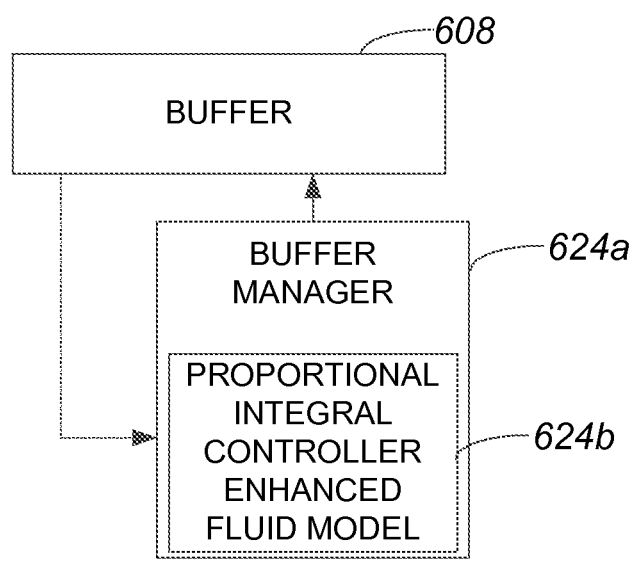
FIG. 6 is a block diagram representation of an overall buffer management system in accordance with an embodiment.

In general, information relating to a drop or mark probability is used by an overall control system to control congestion within a buffer. Using the drop or mark probability, which is an indicator of the likelihood that a packet may be dropped, latency may be controlled. Buffer congestion may be controlled efficiently, e.g., maintained at an acceptable level or reference level, using a drop or mark probability. FIG. 6 is a block diagram representation of an overall buffer management arrangement in accordance with an embodiment. A buffer 608 may be controlled by a module or arrangement that includes a buffer manager 624a and an implementation 624b of a fluid model. Implementation 642b may be a component of controller buffer management module such that information obtained and processed by implementation 642b may be used by buffer manager 624a in order to control buffer occupancy.

Implementation 624b executes a PIE algorithm which estimates a current queuing latency or delay associated with a buffer, and calculates a drop or mark probability. The PIE algorithm also determines, e.g., measures, a departure rate of packets from buffer 608 when there are a sufficient number of packets in buffer 608.

Buffer manager 624a decimates information obtained through implementation 624b, and marks or drops packets from buffer 608. Using buffer manager 624a and implementation 624b, the average latency of a congested queue may be controlled.

As will be understood by those skilled in the art, packet bursts may effectively be handled by buffer 608. The controller including buffer manager 624a and implementation 624b efficiently handles packet bursts, e.g., short term packet bursts, that pass through buffer 608. Since a drop or mark probability may be calculated periodically or otherwise updated relatively regularly, a short term burst that occurs between updates of a drop or mark probability may pass through buffer 608 substantially without incurring extra drops. Further, as a drop or mark probability calculation is performed substantially incrementally, any single update that occurs at the same that that a short term packet burst occurs will not cause a significant change in a drop or mark probability. In one embodiment, a burst allowance may effectively be set to accommodate a packet burst.

Figure 7:
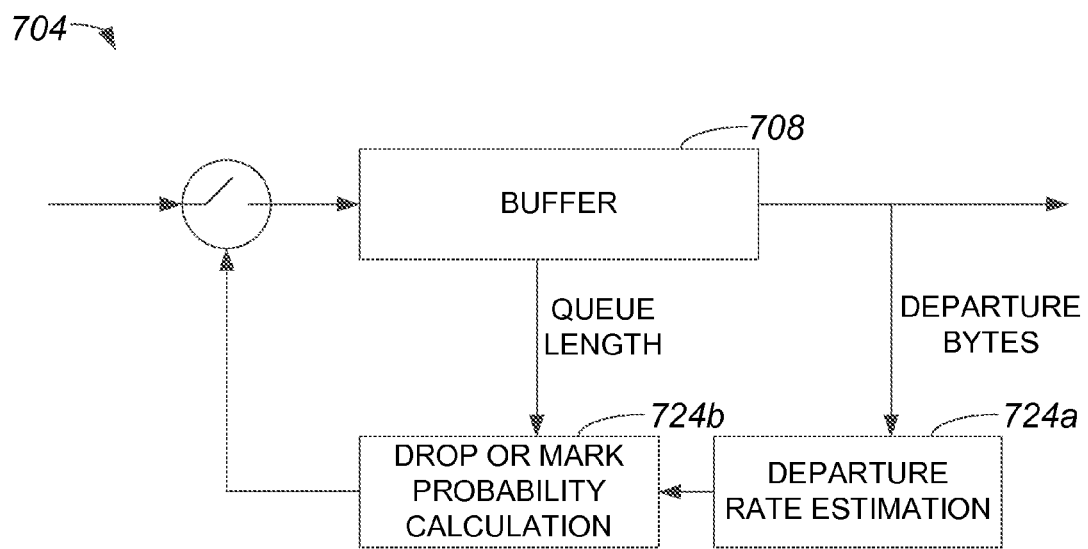
FIG. 7 is a block diagram representation of a proportional integral controller enhanced (PIE) structure in accordance with an embodiment.

FIG. 7 is a block diagram representation of a PIE implementation or structure in accordance with an embodiment. Within a system 704, e.g., a network element, a buffer 708 or a queue obtains packets as input, or queues packets, and provides packets as output, or dequeues packets. Information relating to packets which are dequeued, e.g., information relating to bytes departing buffer 708, are provided to a departure rate estimation module 724a of a PIE structure A departure rate estimated by departure rate estimation module 724a is provided to a drop or mark probability calculation module 724b of a PIE structure which also obtains a queue length associated with buffer 708 and calculates a drop or mark probability using the estimated departure rate and queue length.

Although only a few embodiments have been described in this disclosure, it should be understood that the disclosure may be embodied in many other specific forms without departing from the spirit or the scope of the present disclosure. By way of example, while a short-term packet burst generally will not significantly affect a drop or mark probability, a burst allowance may be added into a PIE implementation or structure. In one embodiment, a burst allowance may be defined such that when the burst allowance is above zero, a packet that is incoming to a buffer may be enqueued such that a random drop process may effectively be bypassed. Each time a drop or mark probability is updated, the value of the burst allowance, which may be initialized to a configurable maximum value, may be decremented by an update period. That is, a burst allowance may be initialized to a substantially maximum burst value.

Tuning of control parameters may involve any suitable process. In general, values of control parameter "a" and control parameter "b" may be selected using a control analysis. Values for control parameters may be chosen using a feedback control analysis such that stability is effectively ensured. For example, the tuning of control parameters may include analyzing Nyquist plots, Bode diagrams, and/or phase margins. Control parameters may be designed using Nyquist plot and Bode diagram techniques to substantially ensure stability margins such as gain margins or phase margins. In general, values of control parameter "a" and control parameter "b" may be tuned such that when a drop or mark probability is relatively large, control parameter "a" and control parameter "b" may have relatively high values, whereas when a drop or mark probability is relatively low, control parameter "a" and control parameter "b" may have relatively low values. Tuning of control parameter "a" and control parameter "b" may effectively be continuous, although it should be appreciated that when a drop or mark probability is relatively stable, control parameter "a" and control parameter "b" may not be adjusted. Self-tuning may be used to effectively set or adjust values of control parameter "a" and control parameter "b." In one embodiment, control parameter "a" and control parameter "b" may essentially vary with time.

A drop or mark probability is generally used to control congestion associated with a buffer, e.g., a drop or mark probability may be considered when determining a rate at which packets are to be inputted or enqueued into a buffer. In addition, when congestion is detected in a buffer, a queueing latency may generally be estimated.

The embodiments may be implemented using any suitable combination of hardware, firmware, and software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Furthermore, while particular components may be described as performing particular steps or other operations, the present disclosure contemplates any suitable component perform such steps or other operations according to particular needs. Therefore, the present examples are to be considered as illustrative and not restrictive, and the examples are not to be limited to the details given herein, but may be modified within the scope of the appended claims.

What is claimed is:

1. A method comprising:
   estimating a rate at which packets associated with a queue of packets are dequeued from a buffer;
   estimating a current queuing latency, the current queuing latency being associated with the queue of packets maintained in the buffer; and
   calculating a current drop probability, the current drop probability being associated with a probability that packets associated with the queue of packets will be dropped, wherein the current drop probability is calculated using the current queuing latency, and wherein calculating the current drop probability includes identifying a first control parameter, identifying a second control parameter, scaling a first factor associated with the current queuing latency and a target queuing latency using the first control parameter to obtain a first value, multiplying a second factor associated with the current queuing latency and a previous queuing latency using the second control parameter to obtain a second value, and adding the first value to the second value to determine the current drop probability.

2. The method of claim 1 wherein calculating the current drop probability further includes adding a previous current drop probability to the first value and to the second value to determine the current drop probability.

3. The method of claim 1 wherein the first control parameter and the second control parameter are obtained selected using a control analysis.

4. The method of claim 1 further including:
   estimating a dequeuing rate associated with the buffer; and
   assessing a length of the queue of packets, wherein estimating the current queuing latency includes estimating the current queuing latency using the dequeuing rate and the length of the queue of packets.

5. The method of claim 1 further including:
   identifying a number of bytes which have departed the buffer within a time period; and
   assessing a length of the queue of packets, wherein estimating the current queuing latency includes estimating the current queuing latency using the length of the queue of packets, the number of bytes which have departed the buffer within the time period, and the time period, and wherein the number of bytes which have departed the buffer within the time period and the time period are used to estimate the dequeueing rate.

6. An apparatus comprising:
   means for estimating a rate at which packets associated with a queue of packets are dequeued from a buffer;
   means for estimating a current queuing latency, the current queuing latency being associated with the queue of packets maintained in the buffer; and
   means for calculating a current drop probability, the current drop probability being associated with a probability that packets associated with the queue of packets will be dropped, wherein the current drop probability is calculated using the current queuing latency, and wherein the means for calculating the current drop probability include means for identifying a first control parameter, means for identifying a second control parameter, means for scaling a first factor associated with the current queuing latency and a target queuing latency using the first control parameter to obtain a first value, means for multiplying a second factor associated with the current queuing latency and a previous queuing latency using the second control parameter to obtain a second value, and means for adding the first value to the second value to determine the current drop probability.

7. A tangible, non-transitory computer-readable medium comprising computer program code, the computer program code, when executed, configured to:
   estimate a rate at which the packets associated with a queue of packets are dequeued from a buffer;
   estimate a current queuing latency, the current queuing latency being associated with the queue of packets maintained in the buffer; and
   calculate a current drop probability, the current drop probability being associated with a probability that packets associated with the queue of packets will be dropped, wherein the current drop probability is calculated using the current queuing latency, and wherein the computer program code configured to calculate the current drop probability is further configured to identify a first control parameter, to identify a second control parameter, to scale a first factor associated with the current queuing latency and a target queuing latency using the first control parameter to obtain a first value, to multiply a second factor associated with the current queuing latency and a previous queuing latency using the second control parameter to obtain a second value, and to add the first value to the second value to determine the current drop probability.

8. The tangible, non-transitory computer-readable medium comprising computer program code of claim 7 wherein the computer program code configured to calculate the current drop probability is further configured to add a previous current drop probability to the first value and to the second value to determine the current drop probability.

9. The tangible, non-transitory computer-readable medium comprising computer program code of claim 7 wherein the first control parameter and the second control parameter are obtained selected using a control analysis.

10. The tangible, non-transitory computer-readable medium comprising computer program code of claim 7 further including computer program code configured to:
estimate a dequeuing rate associated with the buffer; and
assess a length of the queue of packets, wherein estimating the current queuing latency includes estimating the current queuing latency using the dequeuing rate and the length of the queue of packets.

11. The tangible, non-transitory computer-readable medium comprising computer program code of claim 7 further including computer program code configured to:
identify a number of bytes which have departed the buffer within a time period; and
assess a length of the queue of packets, wherein the computer program code configured to estimate the current queuing latency is further configured to estimate the current queuing latency using the length of the queue of packets, the number of bytes which have departed the buffer within the time period, and the time period, and wherein the number of bytes which have departed the buffer within the time period and the time period are used to estimate the dequeueing rate.

12. An apparatus comprising:
a buffer arrangement including a buffer and an input/output (I/O) interface, wherein the I/O interface is arranged to obtain at least one packet, cause the at least one packet to be queued in the buffer, and output the at least one packet;
a logic module which includes computer program code, the logic module being configured to determine an estimated queuing latency associated with the buffer arrangement and to use the estimated queuing latency to control congestion in the buffer; and
a processing arrangement, the processing arrangement configured to execute the computer program code included in the logic module.

13. The apparatus of claim 12 wherein the logic module is configured to use the estimated queuing latency to control the congestion in the buffer by determining a drop or mark probability, the drop or mark probability being a likelihood that an incoming packet will be dropped or marked.

14. The apparatus of claim 13 wherein determining the drop or mark probability includes scaling the estimated queuing latency by at least one control parameter, the at least one control parameter being determined using a control analysis.

15. The apparatus of claim 12 wherein the logic module is still further configured to monitor the buffer and to obtain an estimate of a departure rate of packets from the buffer.

16. The apparatus of claim 15 wherein the estimated queuing latency and the estimated departure rate of the packets is used to determine a drop or mark probability, the drop or mark probability being a likelihood that an incoming packet will be dropped or marked, and wherein congestion is controlled by controlling the departure rate.

17. The apparatus of claim 13 wherein determining the drop or mark probability includes tuning at least one control parameter to determine a balance between a latency offset and a latency jitter.

18. The apparatus of claim 13 wherein the drop or mark probability is a drop or mark probability at a current time and the estimated queuing latency at the current time, and wherein the drop or mark probability at the current time is determined using a drop or mark probability at a previous time, the estimated queuing latency at the current time, an estimated queuing latency at the previous time, and at least one reference value.

* * * * *